United States Patent
Ikeda

(10) Patent No.: US 11,947,895 B2
(45) Date of Patent: Apr. 2, 2024

(54) INFORMATION PROCESSING APPARATUS FOR REPRESENTING A WEB PAGE USING EXTERNAL FONTS, AND INFORMATION PROCESSING METHOD, AND STORAGE MEDIUM THEREOF

(71) Applicant: CANON KABUSHIKI KAISHA, Tokyo (JP)

(72) Inventor: Atsushi Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/364,374

(22) Filed: Jun. 30, 2021

(65) Prior Publication Data

US 2022/0004698 A1 Jan. 6, 2022

(30) Foreign Application Priority Data

Jul. 6, 2020 (JP) .................. 2020-116594

(51) Int. Cl.
*G06F 40/109* (2020.01)
*G06F 3/04847* (2022.01)
*G06F 16/957* (2019.01)
*G06F 40/103* (2020.01)
(Continued)

(52) U.S. Cl.
CPC ........ *G06F 40/109* (2020.01); *G06F 3/04847* (2013.01); *G06F 16/9577* (2019.01); *G06F 40/103* (2020.01); *G06F 40/117* (2020.01); *G06F 40/189* (2020.01)

(58) Field of Classification Search
CPC .. G06F 40/109; G06F 40/103; G06F 3/04847; G06F 16/9577
See application file for complete search history.

(56) References Cited

U.S. PATENT DOCUMENTS

| 5,825,987 A * | 10/1998 | Asada ................ G06K 15/02 358/1.11 |
| 7,468,805 B2 * | 12/2008 | Lo .................... G06F 40/174 358/1.18 |
| 7,469,251 B2 * | 12/2008 | Li ..................... G06F 40/103 |

(Continued)

FOREIGN PATENT DOCUMENTS

CN 110020276 A * 7/2019
JP 2018014603 A * 1/2018

(Continued)

OTHER PUBLICATIONS

John Daggett et al. CSS Fonts Module Level 3, W3C Recommendation Sep. 20, 2018, 95 pages, https://www.w3.org/TR/2018/REC-css-fonts-3-20180920/ (Year: 2018).*

*Primary Examiner* — Benjamin Smith

(74) *Attorney, Agent, or Firm* — Canon U.S.A., Inc. IP Division

(57) ABSTRACT

An information processing apparatus is configured to execute an application containing a first component for displaying a web page and a second component different from the first component. The information processing apparatus selects, in a case where a plurality of external fonts that is externally acquired is determined to be used in a web page displayed in the first component, a font for used in the second component from the plurality of external fonts based on a usage pattern of each of the plurality of external fonts in the web page.

16 Claims, 12 Drawing Sheets

(51) Int. Cl.
  *G06F 40/117* (2020.01)
  *G06F 40/189* (2020.01)

(56) References Cited

U.S. PATENT DOCUMENTS

| | | | | |
|---|---|---|---|---|
| 7,469,378 | B2* | 12/2008 | Nagahara | G06F 40/103 |
| | | | | 715/224 |
| 7,548,334 | B2* | 6/2009 | Lo | G06F 40/174 |
| | | | | 358/1.15 |
| 8,037,410 | B2* | 10/2011 | Ramakrishnan | G06F 40/106 |
| | | | | 715/256 |
| 8,239,763 | B1* | 8/2012 | Fiesinger | G06F 40/103 |
| | | | | 715/269 |
| 8,484,562 | B2* | 7/2013 | Schorsch | G06T 3/40 |
| | | | | 715/269 |
| 8,830,241 | B1* | 9/2014 | Gorner | G09G 5/373 |
| | | | | 382/229 |
| 8,856,647 | B2* | 10/2014 | Howell | G06F 40/109 |
| | | | | 715/269 |
| 8,935,607 | B2* | 1/2015 | Zhu | G06F 16/9577 |
| | | | | 715/269 |
| 8,958,080 | B2* | 2/2015 | Kutsumi | G06F 40/58 |
| | | | | 358/1.11 |
| 9,542,907 | B2* | 1/2017 | Kocienda | G09G 5/00 |
| 9,575,935 | B2* | 2/2017 | Hiratsuka | G06F 40/146 |
| 9,734,132 | B1* | 8/2017 | Kothandapani Shanmugasundaram | G06F 40/103 |
| 10,387,539 | B2* | 8/2019 | Scapa | H04L 67/10 |
| 10,445,408 | B2* | 10/2019 | Sinn | G06F 3/0482 |
| 10,540,168 | B2* | 1/2020 | DiTullio | G06F 8/65 |
| 10,747,510 | B1* | 8/2020 | Lundeen | G06F 8/71 |
| 11,295,495 | B2* | 4/2022 | Aggarwal | G06F 40/106 |
| 11,436,404 | B2* | 9/2022 | Kandari | G06F 40/106 |
| 2005/0094205 | A1* | 5/2005 | Lo | G06F 40/106 |
| | | | | 358/1.18 |
| 2005/0094207 | A1* | 5/2005 | Lo | G06F 40/174 |
| | | | | 358/1.18 |
| 2005/0102617 | A1* | 5/2005 | Nagahara | G06F 40/103 |
| | | | | 715/255 |
| 2005/0162430 | A1* | 7/2005 | Stamm | G09G 5/28 |
| | | | | 345/472 |
| 2006/0277173 | A1* | 12/2006 | Li | G06F 40/103 |
| 2007/0133842 | A1* | 6/2007 | Harrington | G06V 10/993 |
| | | | | 382/112 |
| 2007/0176934 | A1* | 8/2007 | Toivola | G06T 11/60 |
| | | | | 345/467 |
| 2008/0141164 | A1* | 6/2008 | Jiang | G06F 40/103 |
| | | | | 715/786 |
| 2010/0107061 | A1* | 4/2010 | Ramakrishnan | G06F 40/103 |
| | | | | 715/256 |
| 2010/0218086 | A1* | 8/2010 | Howell | G06F 40/109 |
| | | | | 715/236 |
| 2011/0164291 | A1* | 7/2011 | Kutsumi | G06F 40/169 |
| | | | | 358/464 |
| 2011/0289407 | A1* | 11/2011 | Naik | G06F 40/109 |
| | | | | 715/269 |
| 2011/0320938 | A1* | 12/2011 | Schorsch | G06F 40/109 |
| | | | | 715/269 |
| 2012/0166937 | A1* | 6/2012 | Hasegawa | G06F 40/106 |
| | | | | 715/243 |
| 2013/0271471 | A1* | 10/2013 | Schorsch | G06T 3/40 |
| | | | | 345/472.1 |
| 2013/0305145 | A1* | 11/2013 | Jackson | G06F 40/103 |
| | | | | 715/246 |
| 2014/0006942 | A1* | 1/2014 | Pearcy | G06F 40/109 |
| | | | | 715/269 |
| 2014/0362105 | A1* | 12/2014 | Kocienda | G06F 9/451 |
| | | | | 345/600 |
| 2015/0070361 | A1* | 3/2015 | Xu | G06F 40/129 |
| | | | | 345/467 |
| 2015/0088847 | A1* | 3/2015 | Nelson | G06F 16/95 |
| | | | | 707/706 |
| 2015/0215653 | A1* | 7/2015 | Hiratsuka | G06F 40/109 |
| | | | | 382/239 |
| 2016/0103928 | A1* | 4/2016 | Glasgow | G06F 3/04842 |
| | | | | 715/234 |
| 2016/0292134 | A1* | 10/2016 | Elings | G06F 40/106 |
| 2016/0292275 | A1* | 10/2016 | Talton | H04L 67/02 |
| 2017/0102845 | A1* | 4/2017 | Ozuysal | G06F 9/54 |
| 2017/0255597 | A1* | 9/2017 | Sinn | G06F 40/109 |
| 2017/0364481 | A1* | 12/2017 | Scapa | H04L 51/28 |
| 2018/0314513 | A1* | 11/2018 | DiTullio | G06F 8/65 |
| 2020/0401758 | A1* | 12/2020 | Li | G06F 3/0481 |
| 2021/0064691 | A1* | 3/2021 | Kandari | G06F 40/103 |
| 2021/0110587 | A1* | 4/2021 | Aggarwal | G06F 40/106 |

FOREIGN PATENT DOCUMENTS

| | | | | |
|---|---|---|---|---|
| JP | 2018014603 | A | 1/2018 | |
| KR | 1334589 | B1 * | 11/2013 | G06F 17/214 |
| TW | 202123029 | A * | 6/2021 | |
| WO | WO-2015167525 | A1 * | 11/2015 | G06F 17/211 |

* cited by examiner

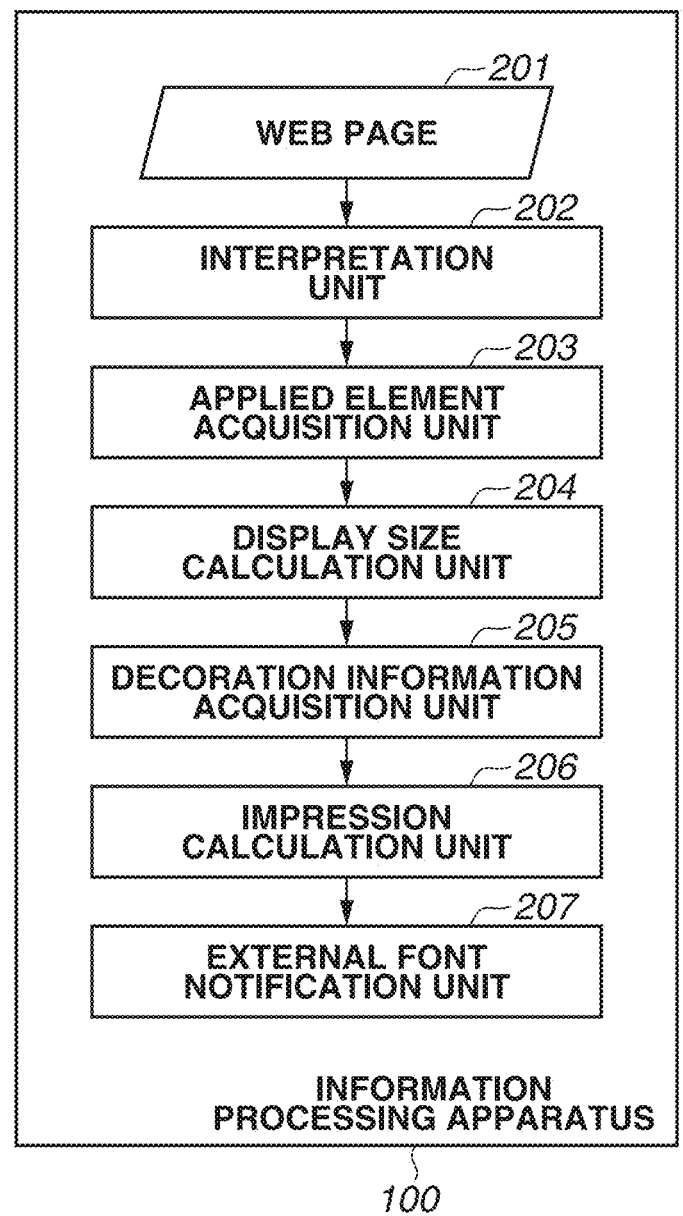

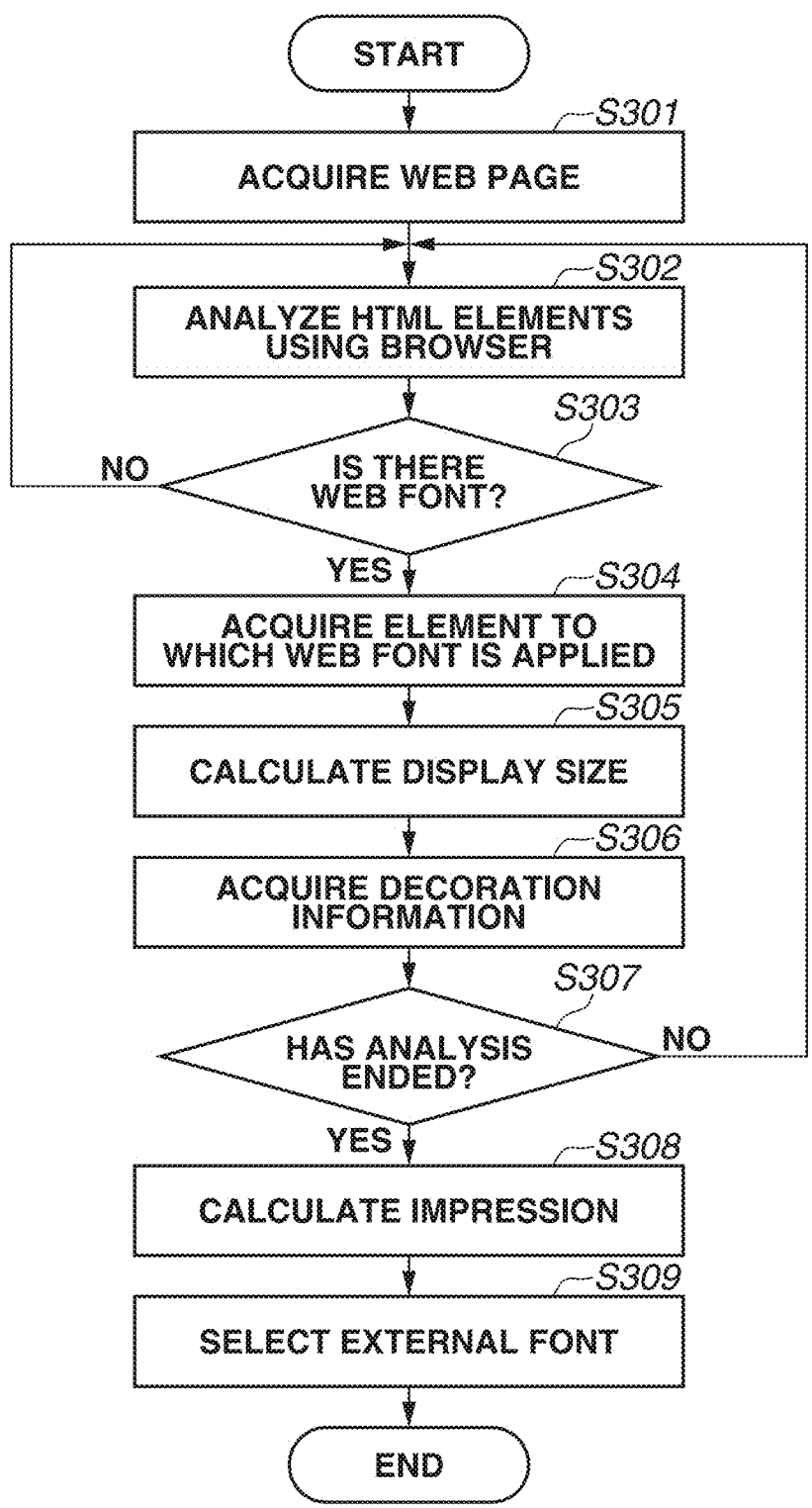

FIG.4A

```
<style>
@font-face {
font-family: 'Sub Font';
src: url('http://example.com/path/to/sub.ttf');
}
@font-face {
font-family: 'Main Font';
src: url('http://example.com/path/to/main.ttf');
}
#sub, #main { border: 1px solid black; }
#sub { font-size:10px; font-family: 'Sub Font';
       text-align: center; }
#main { font-size:24px; font-family: 'Main Font';
        font-weight: bold; background-color: orange; }
</style>
<div id="sub">This is header.</div>
<div id="main">
  <div>NEW YEAR SALE</div>
  <div>2020.01.01-.03</div>
  <div>UP TO 75% OFF</div>
</div>
<div id="sub">This is footer.</div>
```

FIG.4B

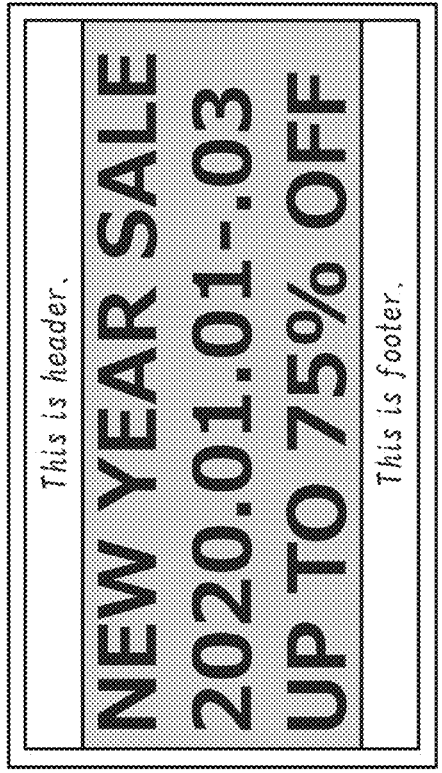

FIG.5

| DECORATION INFORMATION | COEFFICIENT |
|---|---|
| NONE | 1.0 |
| UNDERSCORE | 1.1 |
| BOLD | 1.2 |
| CHARACTER COLOR | 1.5 |
| CHARACTER BACKGROUND COLOR | 2.0 |
| ANIMATION | 2.5 |

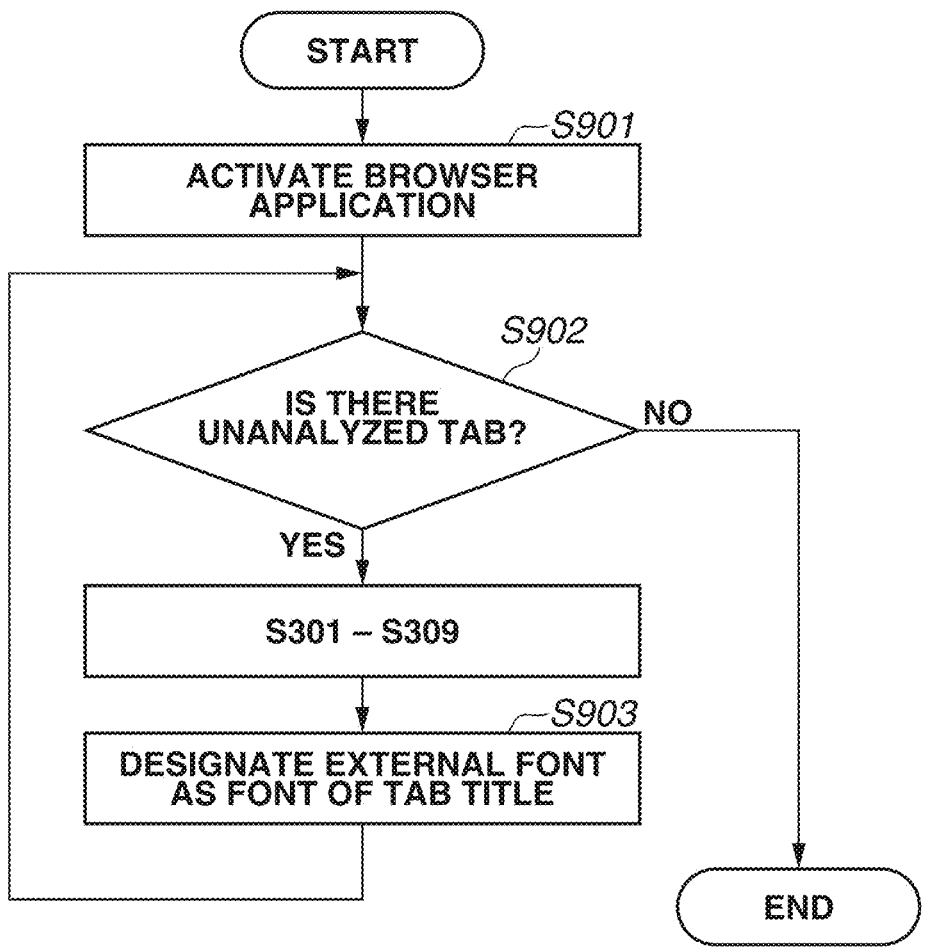

INFORMATION PROCESSING APPARATUS FOR REPRESENTING A WEB PAGE USING EXTERNAL FONTS, AND INFORMATION PROCESSING METHOD, AND STORAGE MEDIUM THEREOF

BACKGROUND

Field

The present disclosure relates to a process for displaying a web page.

Description of the Related Art

Apparatuses with a web browser (hereinafter, referred to as "browser") and a function of browsing web pages on the browser are widely used. Further, a graphical user interface (GUI) component referred to as a WebView component is known. The WebView component has a function similar to that of a web browser and can be used as a component of an application on an apparatus. WebView refers to a function of displaying a web page in an application. An application on such an apparatus can realize a representation and a function that is similar to those of the browser on an application screen by using WebView.

Additionally, a system referred to as "Web Font" is also known. This system provides for representing a web page using external fonts stored on an external server. The external fonts herein refer to fonts that are stored on an external server to be used in the Web Font system.

The Web Font is a technique defined in the Cascading Style Sheets (CSS) Fonts Module Level-3 standard specification. The CSS is a style sheets specification that specifies decorations and styles of web pages.

Japanese Patent Application Laid-Open No. 2018-14603 discusses a method of applying an external font to a GUI component other than a WebView component on an application screen.

According to Japanese Patent Application Laid-Open No. 2018-14603, in a case where a WebView component uses the Web Font system, an external font applied to the WebView component is also applied to a GUI component other than the WebView component to make uniform the fonts of different components in the application.

Japanese Patent Application Laid-Open No. 2018-14603, however, does not discuss a case where a WebView component uses a plurality of types of external fonts, and there is still a possibility of improvement in selecting a suitable external font from a plurality of types of external fonts for a GUI component other than a WebView component, for example.

SUMMARY

Various embodiments of the present disclosure provide an information processing apparatus which selects an external font for use in a second component based on a usage pattern of a plurality of external fonts in a first component for displaying a web page.

According to one embodiment of the present disclosure, an information processing apparatus is configured to execute an application containing a first component for displaying a web page and a second component different from the first component. The information processing apparatus includes a selection unit configured to select, in a case where a plurality of external fonts that is externally acquired is determined to be used in a web page displayed in the first component, a font for use in the second component from the plurality of external fonts based on a usage pattern of each of the plurality of external fonts in the web page, and a drawing unit configured to perform drawing in the second component using the external font selected by the selection unit.

Further features of the present disclosure will become apparent from the following description of exemplary embodiments with reference to the attached drawings.

BRIEF DESCRIPTION OF THE DRAWINGS

FIG. 2 is a diagram illustrating a functional configuration of the information processing apparatus according to the first exemplary embodiment.

FIG. 3 is a flowchart illustrating a process of the information processing apparatus according to the first exemplary embodiment.

FIGS. 4A and 4B are diagrams illustrating a code example and a drawing example in a case where a web font is applied to a Hypertext Markup Language (HTML) element by Cascading Style Sheets (CSS).

FIG. 5 is a diagram illustrating an example of a relationship between decoration information and coefficients.

FIG. 9 is a flowchart illustrating a process according to a third exemplary embodiment.

DESCRIPTION OF THE EMBODIMENTS

Figure 1:
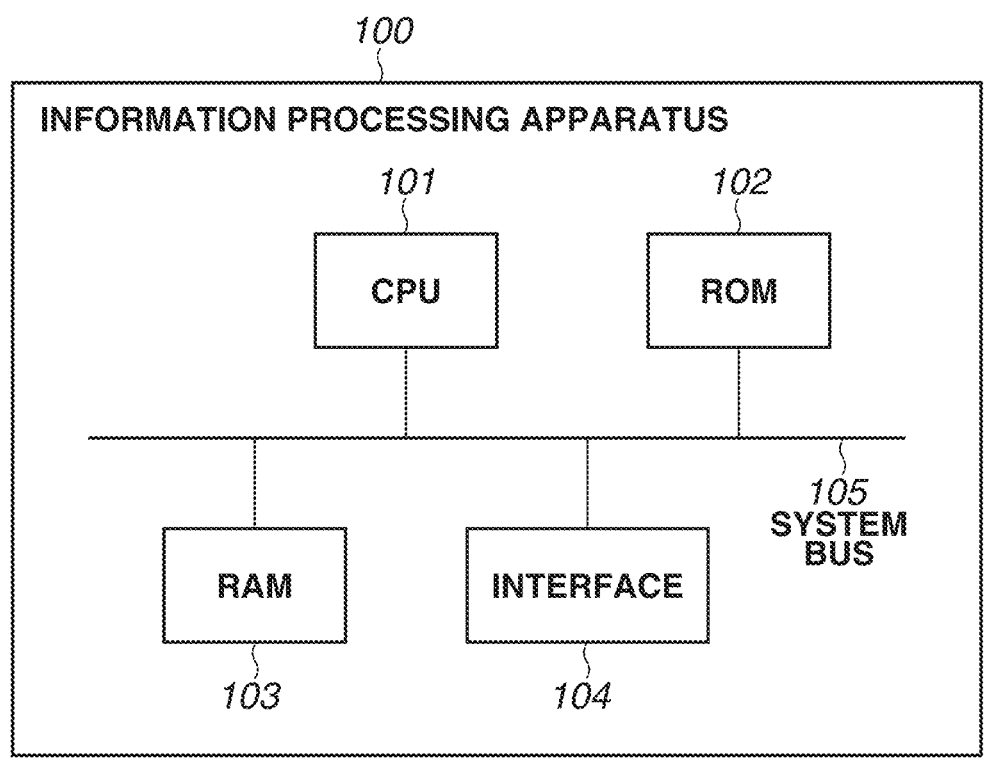
FIG. 1 is a diagram illustrating a hardware configuration of an information processing apparatus according to a first exemplary embodiment.

Various exemplary embodiments of the present disclosure will be described below with reference to the drawings. It should be noted that the below-described exemplary embodiments are not intended to limit the scope of the claimed invention and that not every combination of features described in the exemplary embodiments is always essential to a technical solution of every embodiment of the present disclosure. Similar configurations are given the same reference numeral.

A first exemplary embodiment will be described below. In the first exemplary embodiment, an external font for use in a graphical user interface (GUI) component other than a WebView component is selected appropriately from external fonts used in a web page based on the usage pattern of the external fonts (web fonts) in the WebView component. GUI components are components of a GUI screen, such as buttons, textboxes, and windows. GUI components are also referred to as widgets.

A hardware configuration of an information processing apparatus 100 according to one exemplary embodiment will be described below with reference to FIG. 1. In FIG. 1, a central processing unit (CPU) 101 controls the entire information processing apparatus 100. A read-only memory (ROM) 102 stores programs and parameters that do not need to be changed. A random access memory (RAM) 103 temporarily stores programs and data supplied from external apparatuses.

An interface 104 displays stored data and supplied data. A system bus 105 communicably connects the units 101 to 104 to each other. An interface for a pointing device, e.g., a mouse, or an input device, e.g., a keyboard, for inputting data based on a user operation can be provided.

Further, the information processing apparatus 100 can further include a separate storage apparatus such as a hard disk. Alternatively, an external storage apparatus, such as a flexible disk (FD), an optical disk such as a compact disk (CD), a magnetic or optical card, an integrated circuit (IC) card, or a memory card, that is attachable to and removable from the information processing apparatus 100 can be provided. A network interface for connecting to a network line such as the Internet can also be provided in the information processing apparatus 100.

A functional configuration of the information processing apparatus 100 will be described below with reference to FIG. 2. The below-described functional configuration is realized by the CPU 101 by reading a program stored in the ROM 102 or the external storage apparatus and executing the read program to calculate information, to process information, and to control each piece of hardware. The functional components can be realized by hardware such as an application-specific integrated circuit (ASIC) or field-programmable gate array (FPGA).

In FIG. 2, an interpretation unit 202 analyzes a web page 201 and executes the web page 201. A usage pattern of the interpretation unit 202 can be a WebView component or a browser application. The web page 201 can be data transmitted from an external server or can be data stored on the information processing apparatus 100.

An applied element acquisition unit 203 acquires a Hypertext Markup Language (HTML) element to which a web font is applied based on information obtained by analyzing the web page 201 by the interpretation unit 202. A display size calculation unit 204 calculates a display size of a character string to which the web font is applied based on the HTML element acquired by the applied element acquisition unit 203. A decoration information acquisition unit 205 acquires decoration information about a decoration applied to the HTML element based on the HTML element acquired by the applied element acquisition unit 203. An impression calculation unit 206 calculates an impression based on the usage pattern of the web font in the web page displayed by the WebView component. The impression is information for selecting a web font to be applied to a GUI component that does not display the web page. The impression calculation unit 206 calculates the impression based on the display size acquired by the display size calculation unit 204 and the decoration information acquired by the decoration information acquisition unit 205. The impression is a degree indicating how the usage pattern of a web font in a web page is impressive. An external font notification unit 207 notifies the GUI component other than the WebView component of the external font based on the result obtained by the impression calculation unit 206.

FIG. 3 is a flowchart illustrating a process by the information processing apparatus 100 according to the present exemplary embodiment. The CPU 101 reads a program stored in the ROM 102 or the external storage apparatus and executes the read program to control calculation and processing of information and to control hardware so that the processing of each step in the flowcharts illustrated in FIG. 3 and the subsequent drawings is realized. The processing of each step in the flowcharts illustrated in FIG. 3 and the subsequent drawings can partly or entirely be realized by a single piece of or a plurality of pieces of hardware such as ASICs and FPGAs. The flowchart illustrated in FIG. 3 is started when the information processing apparatus 100 executes an application that contains a GUI component for displaying a web page and a GUI component not for displaying a web page but for displaying content other than the web page.

First, in step S301, the interpretation unit 202 of the information processing apparatus 100 reads the web page 201 displayed by the GUI component for displaying the web page. The web page 201 herein contains a HTML document, a JavaScript® document/file, a Cascading Style Sheets (CSS) file, an external font, and an image.

Then, in step S302, the interpretation unit 202 analyzes each HTML element of the HTML document of the web page 201 sequentially from the top. Next, in step S303, the information processing apparatus 100 determines whether there is a HTML element to which a web font is applied by the CSS. The web font refers to a font that is stored on an external server and is different from a standard font supported as a standard by the information processing apparatus 100. Alternatively, in step S303, the information processing apparatus 100 determines the number of web font types prescribed for the web page 201, and in a case where the determined number is more than one, the processing proceeds to step S304. On the other hand, in a case where the determined number of web font types prescribed for the web page 201 is one, the subsequent steps are skipped, and the web font is determined as a font for use in the GUI component for not displaying the web page but displaying content other than the web page.

In a case where there is a HTML element to which a web font is applied (YES in step S303), the processing proceeds to step S304. In step S304, the applied element acquisition unit 203 of the information processing apparatus 100 acquires the HTML element. On the other hand, in a case where there is not a HTML element to which a web font is applied (NO in step S303), the processing returns to step S302 and the information processing apparatus 100 analyzes the next HTML element.

FIGS. 4A and 4B illustrate an example of a case where a web font is applied to a HTML element by the CSS. FIGS. 4A and 4B illustrate an example of a new year sale event announcement page. FIG. 4A illustrates an example of a code description. The description illustrated in FIG. 4A contains one style element and five div elements. The style element designates a decoration for a HTML element, and each div element displays a character string on the web page. The "div" is a tag that groups elements as a block-level element. The div elements with id="sub" represent a header region and a footer region. The portion in the div element with id="main" represents a text region. FIG. 4B illustrates an appearance obtained as a result of drawing the code description of FIG. 4A by the browser application. As apparent from FIG. 4B, the text region is more impressive than the header region and the footer region.

In the description of the style element in FIG. 4A, "font-family: 'Sub Font'" is designated for the element with "id="sub"". Further, "font-family: 'Main Font'" is designated for the element with "id="main"". For the "font-family: 'Sub Font'" and the "font-family: 'Main Font'", "sub.ttf" and "main.ttf" are respectively designated as external fonts by the description of "@font-face". As a result of analyzing the web page illustrated in FIG. 4A, in step S303, all the div elements are determined as a HTML element to which a web font is applied in the present exemplary embodiment.

Then, in step S305, the display size calculation unit 204 of the information processing apparatus 100 calculates a display size of a character string that is the HTML element acquired in step S304. In the present exemplary embodiment, the display size is calculated using the product of a character size and the number of characters. In the example illustrated in FIG. 4A, the display size is calculated as follows. The character size of the first div element is 10 px, and the number of characters including space characters is 15. Therefore, the display size is calculated as 10×15=150. Further, the character size of the second div element is 24 px, and the total number of characters of the div elements of child elements is 40. Therefore, the display size is calculated as 24×40=960.

The above-described display size calculation method is a mere example, and other calculation methods can be employed in other embodiments. For example, the display size can be calculated by calculating the area of the region. Further, in a case where the interpretation unit 202 stores a display size in an internal memory, the stored display size can be acquired.

Then, in step S306, the decoration information acquisition unit 205 of the information processing apparatus 100 acquires decoration information about a decoration applied to the character string that is the HTML element acquired in step S304. In the example illustrated in FIG. 4A, the first div element does not contain decoration information, whereas "font-weight: bold;" is designated in the second div element. Since the "font-weight: bold;" represents "bold", "bold" is acquired as decoration information. Examples of decoration information that the decoration information acquisition unit 205 acquires are "underscore", "bold", "character color", "character background color", and "animation".

Then, in step S307, the interpretation unit 202 of the information processing apparatus 100 determines whether the analysis of the HTML elements has ended. In a case where the interpretation unit 202 determines that the analysis has not ended (NO in step S307), the processing returns to step S302. On the other hand, in a case where the interpretation unit 202 determines that the analysis has ended (YES in step S307), the processing proceeds to step S308. In step S308, the impression calculation unit 206 of the information processing apparatus 100 calculates an impression for each external font. The impression is calculated using the product of the display size and a coefficient based on the decoration information. Further, in a case where there is a plurality of HTML elements for which an external font is designated, the impressions are totaled for each external font. In a case where there is a plurality of HTML elements for which the same external font is designated, the highest one of the impressions can be determined as the impression of the external font.

FIG. 5 illustrates coefficients for the type of decoration information. For example, the coefficient for "bold" in FIG. 5 is 1.2. Therefore, in a case where "font-weight: bold;" is designated in a HTML element, the coefficient is 1.2. The decoration information that can be designated in a HTML element is a display position, bold, character color, character background color, and animation. The types of information can be selectively used in calculating the impression. Further, the coefficient can be changed based on the content of the decoration information. The coefficient can be changed based on not only the type of decoration information but also the content of the decoration information. For example, in a case where the character color is red, the coefficient is 1.5, whereas in a case where the character color is blue, the coefficient is 1.4. Further, in a case where a plurality of pieces of decoration information is specified in a single element, a value obtained by multiplying the coefficients of the plurality of pieces of decoration information can be used in calculating the impression, or the greatest value of the coefficients of the plurality of pieces of decoration information can be used in calculating the impression.

In the example illustrated in FIG. 4A, the impression is calculated as follows. In the first div element, "sub.ttf" that is an external font is designated. The display size of the first div element is 150, and the first div element does not contain decoration information. Therefore, the impression of the first div element can be calculated as 150×1.0=150. Further, "sub.ttf" is also designated in the last div element. The display size of the last div element is 150, and the last div element does not contain decoration information. Therefore, the impression of the last div element also can be calculated as 150×1.0=150. The total of the impressions of the sub.ttf is calculated as 150×2=300.

Further, in the second div element in which "id="main"" is designated and "main.ttf" that is an external font is designated, "font-weight: bold:" (bold) is designated as decoration information, so that the coefficient of the second div element is 1.2. Therefore, the impression of the main.ttf is the product of the display size and the coefficient based on the decoration information, i.e., is calculated as 960×1.2=1152.

Then, in step S309, the external font notification unit 207 of the information processing apparatus 100 determines an external font to be notified to the GUI component other than the WebView component. In the example illustrated in FIG. 4A, the impression of the sub.ttf is 300, and the impression of the main.ttf is 1152, so that the GUI component other than the WebView component is to be notified of the main.ttf.

The information processing apparatus 100 applies the external font notified by the external font notification unit 207 to the GUI component other than the WebView component in drawing and displays an application screen.

A display example in a case where the present exemplary embodiment is applied will be described below with reference to FIGS. 6A and 6B. FIG. 6B illustrates a display example where the present exemplary embodiment is applied. FIG. 6B illustrates a WebView component 612 and GUI components 613 to 615 other than the WebView component 612. A web page displayed in the WebView component 612 is the same as the web page illustrated in FIG. 4B. In a case where the present exemplary embodiment is applied, an external font (main.ttf) of a text region that is considered to have a high impression and the most impressive appearance in the WebView component 612 is applied to the GUI components 613 to 615.

As described above, in an application containing a WebView component that uses a plurality of web fonts, the web font that has the highest impression is applied to GUI components other than the WebView component. This prevents a situation where the web font is used in the WebView component while a standard font is used in the component other than the WebView component in the application, so that uniformity in the application can be enhanced. Further, since the web font applied to characters in a region that is to be drawn attention based on the display size and the decoration among the plurality of web fonts is also applied to the GUI components other than the WebView component, the intended web page design is maintained in the entire application.

While the configuration in which a font to be applied to GUI components other than a WebView component is determined from a plurality of web fonts by using a display size and decoration information in combination as a web font usage pattern is described above, the present exemplary embodiment is not limited to the configuration, and any other usage patterns can be used. For example, a font to be applied to GUI components other than a WebView component can be determined from a plurality of web fonts by using only one of a display size and decoration information.

Further, for example, a font to be applied to GUI components other than a WebView component can be determined from a plurality of web fonts by using information other than a display size and decoration information. For example, a web font that is described first on the code can be determined as a font to be applied to GUI components other than a WebView component.

Figure 6A:
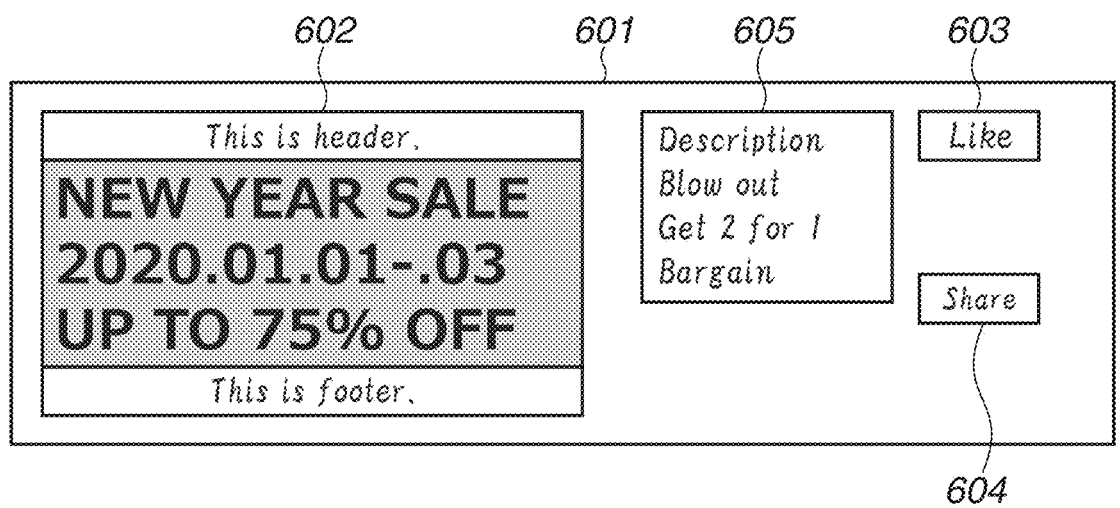
FIGS. 6A and 6B illustrate a display example of an application according to the first exemplary embodiment.
Figure 6B:
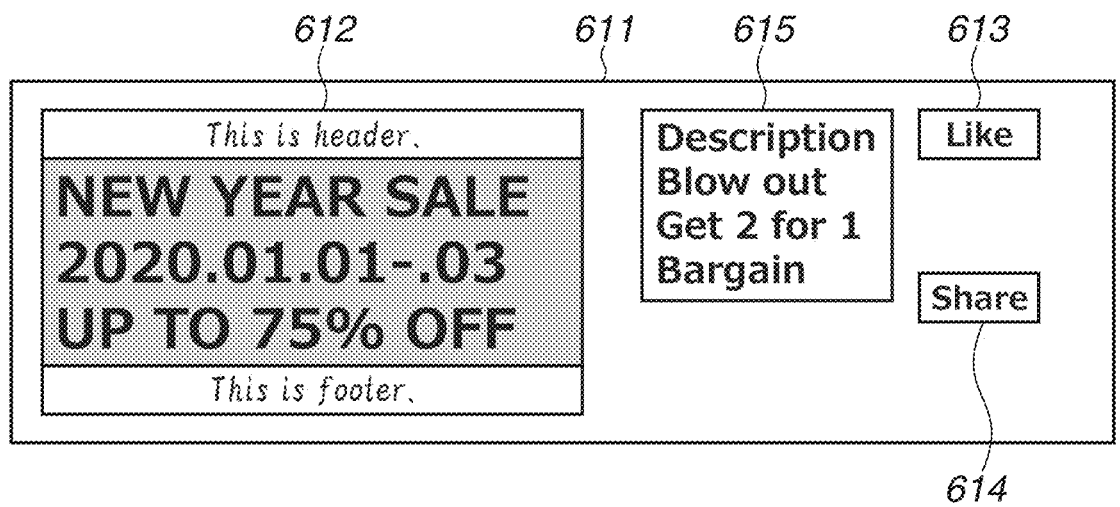

FIG. 6A illustrates a display example in a case where a web font that is described first on a code is determined as a font to be applied to GUI components other than a WebView component. In FIG. 6A, an application 601 is an application that uses a WebView component. The application 601 includes a WebView component 602 and GUI components 603 to 605 other than the WebView component 602. A web page displayed in the WebView component 602 is the same as the web page illustrated in FIG. 4B. The top of the web page displayed in the WebView component 602 is a header region, so that the external font used in the header region is applied to the GUI components 603 to 605.

According to the present exemplary embodiment, in a case where a plurality of external fonts is used in a WebView component that is a GUI component of an application, the external font that is selected based on a web font usage pattern in the WebView component is applied to the other GUI components. Specifically, in the present exemplary embodiment, an external font in a region that has a large display size and/or is visually impressive as though it is decorated among the plurality of external fonts used in the WebView component is applied to the other GUI components. With this technique, even in an application containing a WebView component using a plurality of external fonts and other GUI components, a suitable external font is applied to the other GUI components, so that uniformity of the entire application can be enhanced.

<Second Exemplary Embodiment>

In a second exemplary embodiment, a different external font is selected for each GUI component other than a WebView component from external fonts used in a web page as an external font for use in the GUI component other than the WebView component. Specifically, the external fonts used in the web page are arranged in descending order of the impression, and the GUI components other than the WebView component are also arranged in descending order of the impression. Then, each external font is applied to the component of the same rank.

Figure 7:
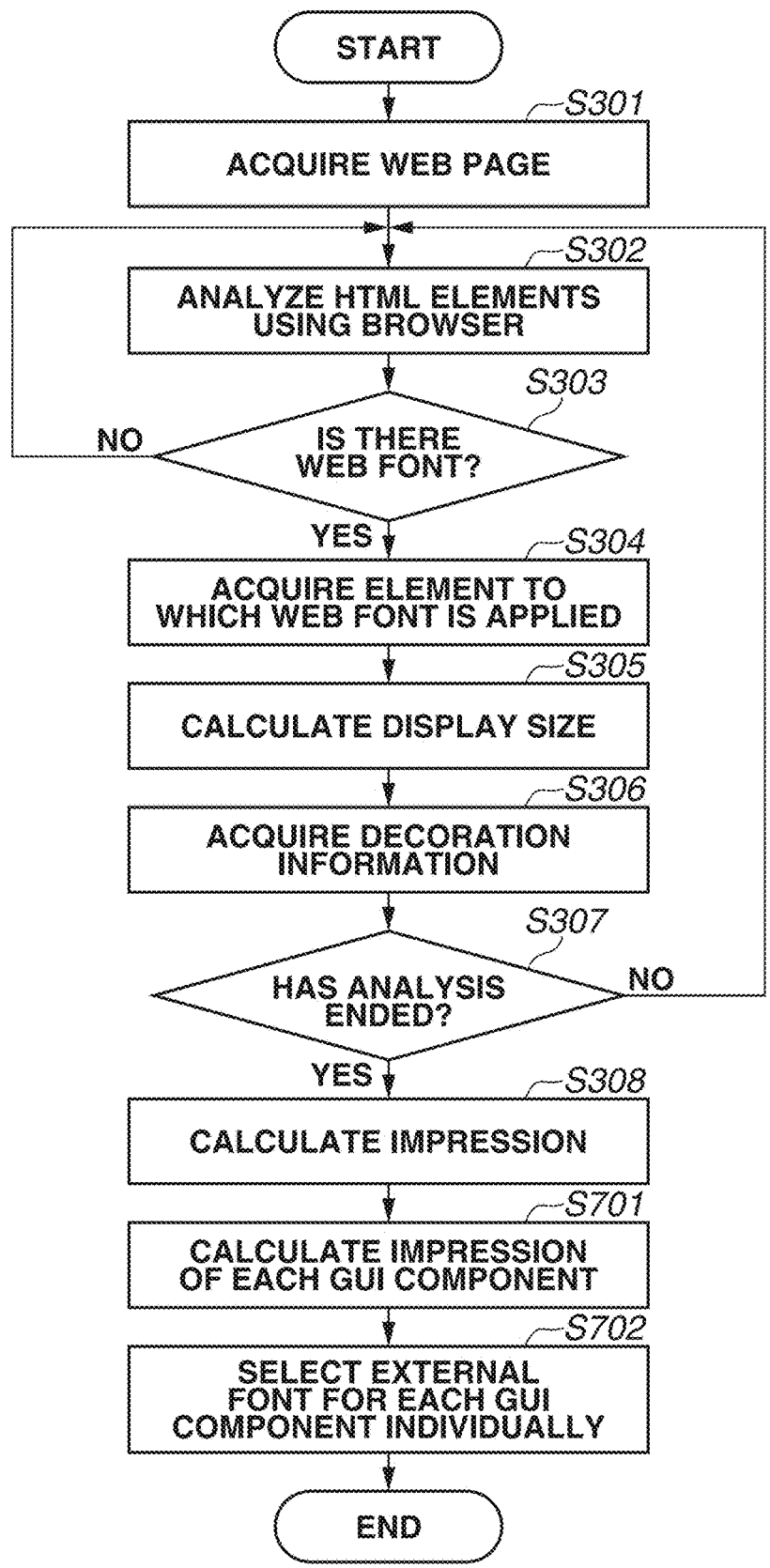
FIG. 7 is a flowchart illustrating a process according to a second exemplary embodiment.

FIG. 7 is a flowchart illustrating a process according to a second exemplary embodiment. In FIG. 7, a step of the same processing as that in FIG. 3 is given the same reference numeral as that in FIG. 3. Steps S301 to S308 in FIG. 7 are similar to those in FIG. 3 described above, so that detailed descriptions thereof are omitted.

In the second exemplary embodiment, in step S701 after the impression is calculated in step S308, the information processing apparatus 100 calculates an impression of each GUI component other than the WebView component. While an impression calculation method similar to that described above is described herein, any other calculation methods can be used.

The calculation of the impression of each GUI component will be described below using the example in FIG. 6A. The number of characters in the character string described in the GUI component 603 is 7, and the font size is 10 px. Therefore, the impression of the GUI component 603 is calculated as 7×10=70. Similarly, the impression of the GUI component 604 is calculated to be 70. Further, the number of characters in the character string described in the GUI component 605 is 23, and the font size is 16 px. Therefore, the impression of the GUI component 605 is calculated as 23×16=368. Accordingly, the impressions of the GUI components 605, 603, and 604 decrease in this order.

Then, in step S702, the external font notification unit 207 of the information processing apparatus 100 individually notifies each of the GUI components other than the WebView component of the external font. In the example illustrated in FIG. 4A, the impression of the sub.ttf is 300, and the impression of the main.ttf is 806.4, so that the external font notification unit 207 notifies each of the GUI components 603 and 604 of the sub.ttf and notifies the GUI component 605 of the main.ttf.

In a case where the impressions of the GUI components 603 and 604 are different, either one of the sub.ttf and the main.ttf can be applied to the GUI component 603.

Specifically, in a case where the number of web fonts and the number of GUI components other than the WebView component are different or in a case where the impressions of the GUI components other than the WebView component are not the same value, a single web font can be applied to the plurality of GUI components. Further, in a case where the number of web fonts and the number of GUI components other than the WebView component are different or in a case where the impressions of the GUI components other than the WebView component are not the same value, there may be a web font that is not applied to the GUI components other than the WebView component.

Figure 8A:
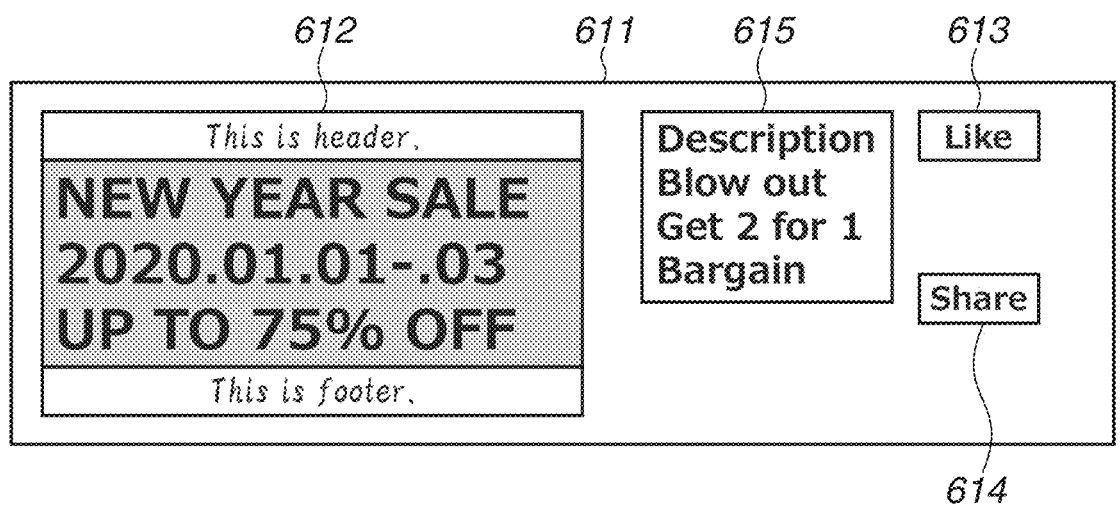
FIGS. 8A and 8B illustrate a display example of an application according to the second exemplary embodiment.
Figure 8B:
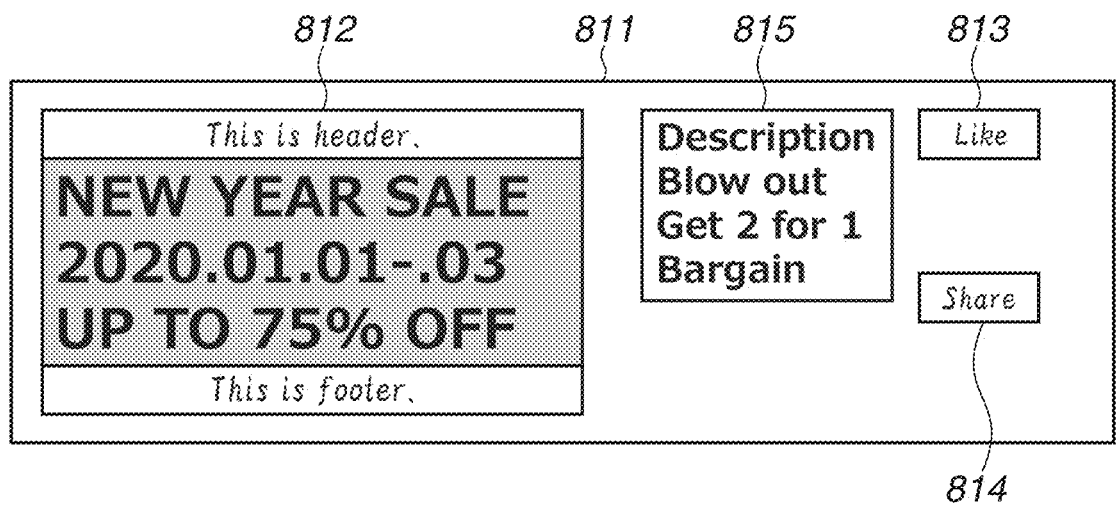

A display example of an application that uses a WebView component according to the second exemplary embodiment will be described below with reference to FIGS. 8A and 8B. FIG. 8A illustrates an example similar to that illustrated in FIG. 6B. FIG. 8B illustrates a display example in a case where the second exemplary embodiment is applied. FIGS. 8A and 8B are different in that external fonts in the GUI components 613 and 614 are the main.ttf whereas external fonts in GUI components 813 and 814 are the sub.ttf.

According to the second exemplary embodiment, the impression of an external font in a web page displayed in a WebView component and the impression of an external font in GUI components other than the WebView component are matched to enable designation of an external font corresponding to the strength of visual impression.

Further, according to the second exemplary embodiment, in an application containing a WebView component and a plurality of GUI components that does not display a web page, different and more suitable external fonts are applied to the plurality of GUI components that does not display the web page.

While the description is given above of the configuration in which a web font to be applied is selected for each GUI component, a web font to be applied can be selected for each HTML element in a GUI component.

<Third Exemplary Embodiment>

In a third exemplary embodiment, an external font is used as a font to be applied to a title character string displayed in a tab of a browser application.

FIG. 9 is a flowchart illustrating a process according to the third exemplary embodiment. In the third exemplary embodiment, first, in step S901, the information processing apparatus 100 activates the browser application. Then, in step S902, the information processing apparatus 100 determines whether there is a tab with an unanalyzed web page. In a case where the information processing apparatus 100 determines that there is not a tab with an unanalyzed web page (NO in step S902), the process is ended. On the other hand, in a case where there is a tab with an unanalyzed web page (YES in step S902), the processing proceeds to step S301. Thereafter, the steps up to step S309 are performed. Then, in step S903, the information processing apparatus 100 designates the external font selected in step S309 as the font of the tab title. Thereafter, the processing returns to S902.

Figure 10:
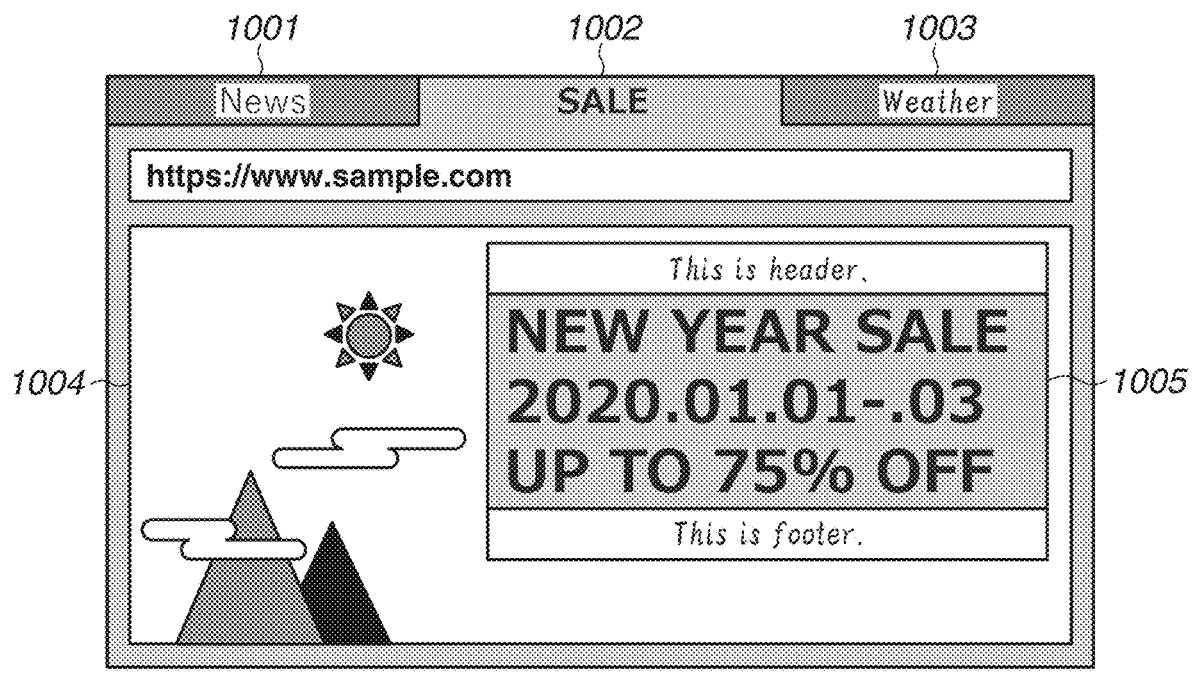
FIG. 10 illustrates a display example of an application according to the third exemplary embodiment.

FIG. 10 illustrates an appearance of a browser application in a case where the third exemplary embodiment is applied. The browser application includes tabs 1001 to 1003. The tabs 1001 and 1003 have the same color while the color of the tab 1002 is different from the color of the tabs 1001 and 1003. This indicates that the tab 1002 is selected by a user. The FIG. 10 also illustrates a web page 1004 and a HTML element set 1005 to which the web font is applied in the web page 1004. The HTML element set 1005 has a configuration similar to that in FIG. 4A.

An external font designated for a component having the highest impression in the HTML element set 1005 is the main.ttf. Therefore, the main.ttf is selected in step S309, and the main.ttf is designated as the font of the title character string of the tab 1002 in step S903.

<Fourth Exemplary Embodiment>

In a fourth exemplary embodiment, an example of a case where a web font is applied to a top screen of a user interface of the information processing apparatus 100 that includes a plurality of applications configured to cooperate with a web page will be described below.

Figure 11:
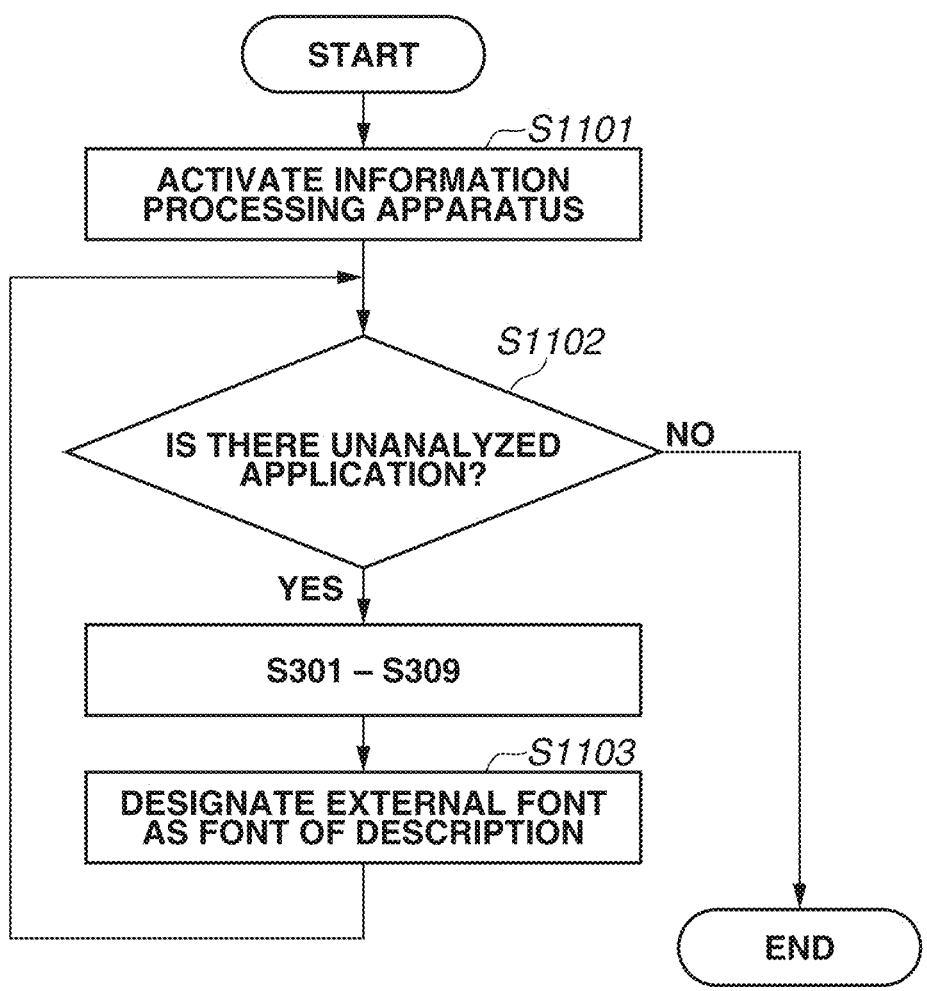
FIG. 11 is a flowchart illustrating a process according to a fourth exemplary embodiment.

FIG. 11 is a flowchart according to the fourth exemplary embodiment. In the fourth exemplary embodiment, first, in step S1101, the information processing apparatus 100 is activated. Then, in step S1102, the information processing apparatus 100 determines whether there is an application with an unanalyzed web page. In a case where the information processing apparatus 100 determines that there is not an application with an unanalyzed web page (NO step S1102), the process ends. On the other hand, in a case where there is an application with an unanalyzed web page (YES in step S1102), the processing proceeds to step S301. Thereafter, steps S301 to S309 are performed. Then, in step S1103, the information processing apparatus 100 designates the external font selected in step S309 as a font of a description of the application. Thereafter, the processing returns to S1102.

Figure 12:
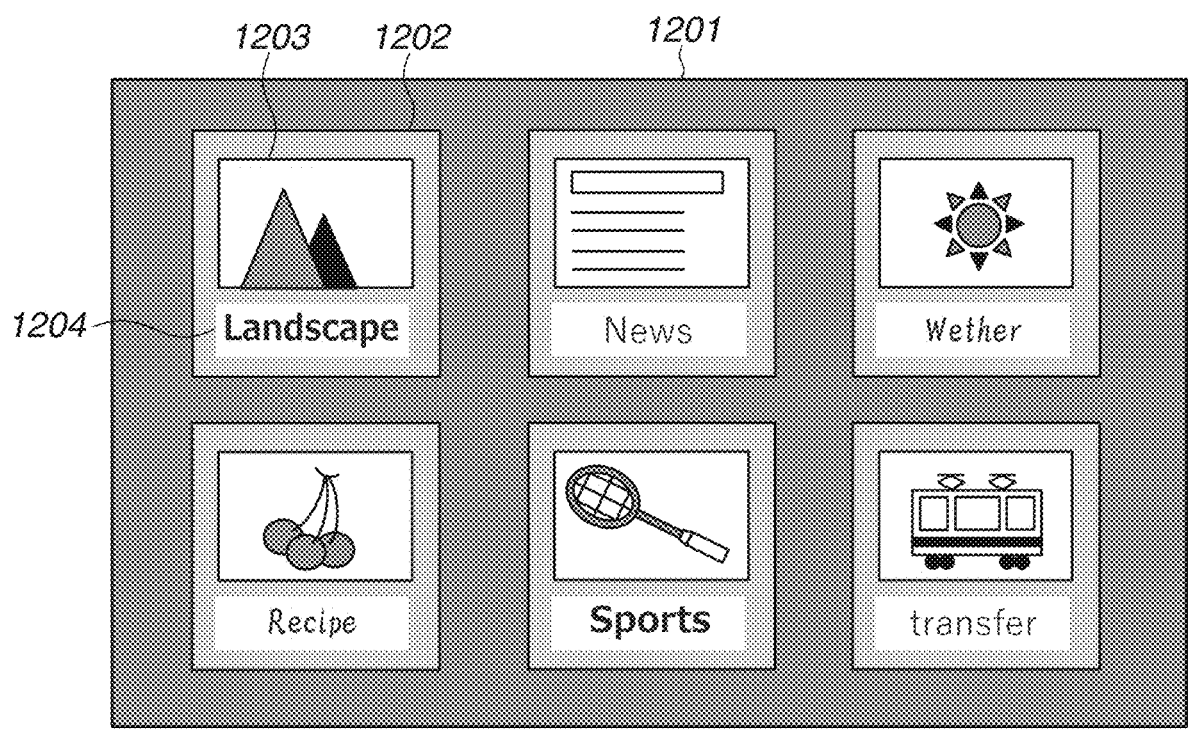
FIG. 12 is a diagram illustrating icons for activating an application and descriptions of the icons according to the fourth exemplary embodiment.

FIG. 12 illustrates an appearance of a top screen of the user interface of the information processing apparatus 100 in a case where the fourth exemplary embodiment is applied. The FIG. 12 illustrates a top screen 1201 and an application activation icon 1202. When the application activation icon 1202 is pressed by a user, the information processing apparatus 100 activates an application associated with the application activation icon 1202. An image 1203 briefly illustrates the application, and a description 1204 briefly describes the application.

At the press of the application activation icon 1202, content 811 in FIG. 8B is activated. The external font with the highest impression in FIG. 8B is the main.ttf. Thus, the main.ttf is selected in step S309, and the main.ttf is designated as a font of the brief description 1204 of the application in step S1103. If the fourth exemplary embodiment is applied, the descriptions of the applications can be displayed in different fonts as illustrated in FIG. 12.

According to the above-described exemplary embodiment, a font for use in an application is selected based on the impression of a HTML element that uses an external font. This improves the expression of the application.

Further, according to the present exemplary embodiment, in a case where a plurality of external fonts is used in a WebView component that is a GUI component of an application, a suitably-selected external font is applied to a GUI component other than the WebView component to improve uniformity of the entire application.

Further, according to the present exemplary embodiment, a font for use in an application is selected based on the impression of a HTML element that uses an external font. This improves the expression of the application.

Further, for example, a header region, a text region, and a footer region are usually separately arranged in an event announcement site or a corporate homepage. Here assume that different external fonts are applied to the header region, the text region, and the footer region where web fonts are used. Normally, the sizes of characters in the header region and the footer region are set smaller than that in the text region to make the header region and the footer region unremarkable. On the other hand, the size of characters in the text region is normally set larger than those in the other regions to make the text region remarkable. In this case, the present exemplary embodiment makes it possible to apply the external font used in the text region having the strongest impression in the web page to GUI components other than a WebView component.

Meanwhile, there is a case where the external font used in a header region and a footer region of a homepage is designed to express information compactly in small regions. In this case, the external font of the header region and the footer region is more suitable for a GUI component that is other than a WebView component and has a small display region than the external font of a text region.

According to the present exemplary embodiment, in a case where a plurality of types of external fonts is used in a WebView component, an external font is applied to a GUI component other than the WebView component based on how strong the visual impression of the component that uses a web font is.

Meanwhile, a web page creator can realize a uniform appearance of characters on any apparatus using web fonts. This leads to enhancement of the brand power of a corporation that develops the web page and a reduction in the number of hours needed to develop the web page.

According to the present exemplary embodiment, when a web font is used in a WebView component, an external font is applied only to the region of the WebView component. Thus, the present exemplary embodiment can solve an issue that the fonts of the WebView component and other GUI components that are displayed together are not uniform.

[Other Exemplary Embodiment]

Various embodiments of the present disclosure can also be realized by the process in which a program for realizing one or more functions of the above-described exemplary embodiment is supplied to a system or an apparatus via a network or a storage medium, and one or more processors of the system or the apparatus read the program and execute the read program. Various embodiments of the present disclosure can also be realized by a circuit (e.g., ASIC) configured to realize the one or more functions.

Further, instead of the impression calculation unit 206 among the above-described processing units, a trained model generated by machine learning can be used in processing. In this case, for example, a plurality of combinations of input data and output data to and from the processing unit is prepared as training data, and knowledge is acquired from the training data by machine learning. Then, a trained model that outputs output data in response to input data is generated based on the acquired knowledge. The trained model can be, for example, a neural network model. The trained model performs the processing of the above-described processing unit by operating in cooperation with a CPU or a graphical processing unit (GPU) as a program for performing processing equivalent to the processing of the above-described processing unit. The trained model can be updated after a predetermined process as needed.

According to various exemplary embodiment of the present disclosure, an external font for use in a second component is selected based on a usage pattern of a plurality of external fonts in a first component for displaying a web page.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-116594, filed Jul. 6, 2020, which is hereby incorporated by reference herein in its entirety.

What is claimed is:

1. An information processing apparatus configured to execute an application containing a first component for displaying a web page and a second component for displaying a content different from the web page, the information processing apparatus comprising:
one or more processors; and
one or more memories including instructions that, when executed by the one or more processors, cause the apparatus to:
select, in a case where a plurality of external fonts that is externally acquired is used in a web page displayed in the first component, a font for use in the second component from the plurality of external fonts based on comparison of values which indicates region sizes of the plurality of external fonts in the web page which is displayed;
wherein the information processing apparatus selects the font for use in the second component based on a product of a display size of a character string to which an external font included in the plurality of external fonts is applied in the web page and a coefficient of a decoration applied to the character string; and
perform drawing in the second component using the selected external font for displaying the content with the web page.

2. The information processing apparatus according to claim 1, wherein the information processing apparatus selects the font for use in the second component based on a display size of a character string to which an external font included in the plurality of external fonts is applied in the web page.

3. The information processing apparatus according to claim 1, wherein the information processing apparatus selects the font for use in the second component based on a product of a character size of a character string to which an external font included in the plurality of external fonts is applied in the web page and a number of characters of the character string.

4. The information processing apparatus according to claim 1, wherein the information processing apparatus selects the font for use in the second component based on a decoration applied to a character string to which an external font included in the plurality of external fonts is applied in the web page.

5. The information processing apparatus according to claim 4, wherein the decoration is an underscore, a use of a bold typeface, a character color, a character background color, or an animation.

6. The information processing apparatus according to claim 1, wherein the information processing apparatus selects one of the plurality of external fonts as the font for use in the second component.

7. The information processing apparatus according to claim 1, wherein, in a case where the application contains a third component, the information processing apparatus selects respective external fonts, from the plurality of external fonts, for use in the second and third components, the external fonts being different from each other.

8. The information processing apparatus according to claim 7, wherein the information processing apparatus selects the external fonts for use in the second and third components based on display sizes of character strings displayed in the second and third components and decorations applied to the character strings displayed in the second component.

9. The information processing apparatus according to claim 1, wherein the first component is a WebView component.

10. The information processing apparatus according to claim 1, wherein the second component is a graphical user interface (GUI) component that does not display a web page.

11. The information processing apparatus according to the information processing apparatus according to wherein the application is a browser application, wherein the first and second components are each a tab, and wherein the information processing apparatus selects a font for use for a tab title of the second component.

12. The information processing apparatus according to claim 1, wherein the external font selected by the information processing apparatus is applied to a description of the application.

13. The information processing apparatus according to claim 1, wherein the information processing apparatus selects the external font that is described first in a code of the web page as the font for use in the second component.

14. The information processing apparatus according to claim 1, wherein the external font is a web font.

15. A method of processing information by an information processing apparatus configured to execute an application containing a first component for displaying a web page and a second component for displaying a content different from the web page, the method comprising:
selecting, in a case where a plurality of external fonts that is externally acquired is used in a web page displayed in the first component, a font for use in the second component from the plurality of external fonts based on comparison of values which indicates region sizes of the plurality of external fonts in the web page which is displayed;

wherein the information processing apparatus selects the font for use in the second component based on a product of a display size of a character string to which an external font included in the plurality of external fonts is applied in the web page and a coefficient of a decoration applied to the character string; and performing drawing in the second component using the selected external font for displaying the content with the web page.

16. A non-transitory storage medium that stores a program for causing an information processing apparatus to perform a process, the information processing apparatus configured to execute an application containing a first component for displaying a web page and a second component for displaying a content different from the web page, the process comprising:

selecting, in a case where a plurality of external fonts that is externally acquired is used in a web page displayed in the first component, a font for use in the second component from the plurality of external fonts based on comparison of values which indicates region sizes of the plurality of external fonts in the web page which is displayed;

wherein the information processing apparatus selects the font for use in the second component based on a product of a display size of a character string to which an external font included in the plurality of external fonts is applied in the web page and a coefficient of a decoration applied to the character string; and performing drawing in the second component using the selected external font for displaying the content with the web page.

\* \* \* \* \*